United States Patent
Yamamoto et al.

(10) Patent No.: US 8,878,717 B2
(45) Date of Patent: Nov. 4, 2014

(54) PROJECTION DETECTING APPARATUS AND PROJECTION DETECTING METHOD

(75) Inventors: Masahiro Yamamoto, Tokyo (JP); Mitsutoshi Kenmochi, Tokyo (JP); Toshihiro Sasaki, Tokyo (JP)

(73) Assignees: Nireco Corporation, Tokyo (JP); JFE Steel Corporation, Tokyo (JP)

( * ) Notice: Subject to any disclaimer, the term of this patent is extended or adjusted under 35 U.S.C. 154(b) by 616 days.

(21) Appl. No.: 13/126,061

(22) PCT Filed: Sep. 15, 2010

(86) PCT No.: PCT/JP2010/005630
§ 371 (c)(1),
(2), (4) Date: Jun. 9, 2011

(87) PCT Pub. No.: WO2011/052130
PCT Pub. Date: May 5, 2011

(65) Prior Publication Data
US 2011/0241924 A1  Oct. 6, 2011

(30) Foreign Application Priority Data
Oct. 28, 2009  (JP) ................................ 2009-247919

(51) Int. Cl.
*G01S 13/00* (2006.01)
*G01B 15/08* (2006.01)
*G01S 13/04* (2006.01)

(52) U.S. Cl.
CPC *G01B 15/08* (2013.01); *G01S 13/04* (2013.01)
USPC ......................................................... 342/27

(58) Field of Classification Search
CPC ...... G01S 13/04; G01S 13/0209; G01S 13/56
USPC .......................................................... 342/27
See application file for complete search history.

(56) References Cited

U.S. PATENT DOCUMENTS 4,676,637 A * 6/1987 Uto et al. .................... 356/237.4
6,380,849 B1 * 4/2002 Eckstine et al. ............. 340/436

(Continued)

FOREIGN PATENT DOCUMENTS

JP  31-699   2/1956
JP  48-2617  1/1973

(Continued)

OTHER PUBLICATIONS

International Preliminary Report on Patentability, PCT/JP2010/005630, Jun. 12, 2012.*

(Continued)

*Primary Examiner* — Frank J McGue
(74) *Attorney, Agent, or Firm* — Squire Patton Boggs (US) LLP

(57) ABSTRACT

A projection detecting apparatus according to the present invention is that for detecting a projection on a surface of a running metal object, and includes a transmission antenna for radiating electromagnetic waves; a reception antenna for receiving reflected electromagnetic waves; and a transmission and reception signal processing section for processing a transmission signal and a reception signal. The transmission antenna and the reception antenna have unidirectionality and the transmission antenna and the reception antenna are installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection.

8 Claims, 15 Drawing Sheets

(56) References Cited

U.S. PATENT DOCUMENTS

| | | | | |
|---|---|---|---|---|
| 2008/0297401 | A1* | 12/2008 | Nishida | 342/147 |
| 2011/0169687 | A1* | 7/2011 | Buyukozturk et al. | 342/25 F |

FOREIGN PATENT DOCUMENTS

| JP | 52-95251 | | 8/1977 |
| JP | 52095251 | * | 8/1977 |
| JP | 54-136293 | | 10/1979 |
| JP | 54136293 | * | 10/1979 |
| JP | 60-27347 | | 2/1985 |
| JP | 60027347 | * | 2/1985 |
| JP | 61-266907 | | 11/1986 |
| JP | 61-266907 | A | 11/1986 |
| JP | 61266907 | * | 11/1986 |
| JP | 06-294627 | | 10/1994 |
| JP | 09-257442 | | 10/1997 |
| JP | 2004-069571 | A | 3/2004 |

OTHER PUBLICATIONS

Japanese Office Action application No. 2009-247919 dated Aug. 27, 2013.

* cited by examiner

PROJECTION DETECTING APPARATUS AND PROJECTION DETECTING METHOD

TECHNICAL FIELD

The present invention relates to a projection detecting apparatus and a projection detecting method for detecting a projection on a metal surface. The present invention relates particularly to a projection detecting apparatus and a projection detecting method for detecting a projection on a surface of a running metal object.

BACKGROUND ART

In a metal processing line such as a cold-rolling line and a continuous annealing line, a running steel strip (hereinafter also called a strip) is sometimes buckled in the width direction because of various reasons including an uneven stress distribution on the strip due to a shape of the strip or a shape of rolls and a projection called a strip width reduction (or a buckling) is generated.

If a strip width reduction is generated and the steel strip is kept running, the strip width reduction will grow and may lead to a break of the steel strip. Since a break of the steel strip in a metal processing line significantly reduces productivity, generation of a strip width reduction has to be found at an early stage.

As a method to find a strip width reduction at an early stage, there are a visual inspection method with an ITV and a method in which a parallel light such as a laser beam is emitted by a light source on one side of a roll and the light is received by a photo-receiver on the other side of the roll to detect a strip width reduction through a change in an amount of received light as described in Patent Documents 1 and 2.

However, in the visual inspection method with an ITV, a strip width reduction might not be found due to a human error or an unclear image and the method requires continuous monitoring. Further, the method in which a parallel light is emitted on one side of a roll described in Patent Documents 1 and 2, is affected by a flutter of the running steel strip, and therefore the apparatus can be installed only around a roll where a flutter of the steel strip hardly occurs. A flutter of the steel strip means a change of position in a direction vertical to the surface of the steel strip. Further, the method requires troublesome pre-adjustment including adjustment of positions at which the light source and the receiver are set and the method may be affected by environment such as temperature and dusts and therefore may lead to a midsection.

Thus, a projection (strip width reduction) detecting apparatus and a projection detecting method which enable a high-accuracy detection of a strip width reduction even with a flutter of the strip and under adverse surrounding environments in a metal strip processing line have not been developed. More generally, a projection detecting apparatus and a projection detecting method which ensure detection of a projection formed on surface of a running metal object continuously in the running direction even when a position in a direction different from the running direction of a running metal object changes and the surrounding environments are adverse ones have not been developed.

PRIOR ART DOCUMENTS

Patent Documents

Patent Document 1: JP06-294627
Patent Document 2: JP09-257442

SUMMARY OF THE INVENTION

Problems to be Solved by the Invention

Accordingly, there is a need for a projection detecting apparatus and a projection detecting method which ensure detection of a projection formed on a surface of a running metal object continuously in the running direction even when a position in a direction different from the running direction of the running metal object changes and the surrounding environments are adverse ones.

Means for Solving the Problem

A projection detecting apparatus according to the present invention is that for detecting a projection on a surface of a running metal object, and includes a transmission antenna for radiating electromagnetic waves; a reception antenna for receiving reflected electromagnetic waves; and a transmission and reception signal processing section for processing a transmission signal and a reception signal. The transmission antenna and the reception antenna have unidirectionality and the transmission antenna and the reception antenna are installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection.

In the projection detecting apparatus according to the present invention, the transmission antenna and the reception antenna are installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection, and therefore the apparatus is able to detect a projection with a high sensitivity and without fail. Further, the apparatus uses electromagnetic waves and therefore it is resistant to being affected by the surrounding environments. In the projection detecting apparatus according to the present invention, the transmission antenna and the reception antenna have unidirectionality, and therefore the apparatus efficiently detects a projection existing in the direction. Further, the detection range is a space of a certain size around the direction. Accordingly, the apparatus is able to detect a projection without being affected by a change in a position of the running metal object, such as a flutter of a metal strip in a processing line of the metal strip.

In an embodiment of the present invention, the transmission antenna and the reception antenna are installed in such a way that electric field planes of electromagnetic waves handled by the transmission antenna and the reception antenna are parallel to the running direction of the metal object.

A projection is generated along the running direction of the metal object, and therefore it can be more effectively detected with electromagnetic waves whose electric field planes are parallel to the running direction of the metal object.

In an embodiment of the present invention, the transmission antenna and the reception antenna have directional gain whose value is from 15 dBi to 25 dBi and the transmission antenna and the reception antenna are installed adjacent to each other in such a way that electromagnetic waves transmitted by the transmission antenna are incident on the metal surface at an angle whose value is from 40 to 60 degrees.

When electromagnetic waves are incident on the metal surface at an angle whose value is 60 degrees or less, the reception antenna does not catch electromagnetic waves reflected on the metal surface without a projection thereon. Further, when electromagnetic waves are incident on the metal surface at an angle whose value is 40 degrees or more, the reception antenna is able to catch electromagnetic waves reflected on the projection. Accordingly, according to the present embodiment the reception antenna is able to catch electromagnetic waves reflected on the projection alone.

In an embodiment of the present invention, the running metal object is a metal strip.

According to the present embodiment, the apparatus is able to detect a strip width reduction without fail even with a flutter of the strip and even in adverse surrounding environments.

In an embodiment of the present invention, the transmission and reception signal processing section detects a position of the projection using time between the radiation and the reception of electromagnetic waves.

According to the present embodiment, data on a position of the projection can be obtained.

In an embodiment of the present invention, the transmission and reception signal processing section sets a gate in time axis based on an area in which the projection can exist and detects the projection only within a range of the gate.

According to the present embodiment, an erroneous detection of a projection at a position at which a projection cannot exist can be prevented.

In an embodiment of the present invention, the transmission and reception signal processing section removes signals of reflected waves from objects besides the projection based on signals of reflected waves from the metal surface without a projection thereon.

According to the present embodiment, a projection can be detected with a high accuracy by removing signals of reflected waves from objects besides the projection.

A projection detecting apparatus according to the present invention is that for detecting a projection on a surface of a metal object, and includes a transmission antenna for radiating electromagnetic waves; a reception antenna for receiving reflected electromagnetic waves; and a transmission and reception signal processing section for processing a transmission signal and a reception signal. The transmission antenna and the reception antenna have directional gain whose value is from 15 dBi to 25 dBi and the transmission antenna and the reception antenna are installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection.

In the projection detecting apparatus according to the present invention, the transmission antenna and the reception antenna are installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection, and therefore the apparatus is able to detect a projection with a high sensitivity and without fail. Further, the apparatus uses electromagnetic waves and therefore it is resistant to being affected by surrounding environments. In the projection detecting apparatus according to the present invention, the transmission antenna and the reception antenna have directional gain whose value is from 15 dBi to 25 dBi, and therefore the detection range is a space of a certain size. Accordingly, the apparatus is able to detect a projection without being affected by a change in a position of the projection.

A projection detecting method, according to the present invention, for detecting a projection on a surface of a running metal object, includes the steps of generating, by a signal processing section, a transmission signal; and radiating, by a transmission antenna, electromagnetic waves as the transmission signal toward the surface of the running metal object. The present method further includes the steps of receiving, by a reception antenna, electromagnetic waves which have been reflected on the projection on the surface of the metal object without receiving electromagnetic waves which have been reflected on the surface of the running metal object, the reception antenna being installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection; processing, by the signal processing section, received electromagnetic waves to generate a reception signal; and detecting the projection on the surface of the metal object by using the transmission signal and the reception signal.

In the present method, the reception antenna is installed in such a way that the reception antenna does not catch electromagnetic waves which have been radiated by the transmission antenna and reflected on the surface of the metal object and the reception antenna catches electromagnetic waves alone which have been radiated by the transmission antenna and reflected on the projection, and therefore the apparatus is able to detect a projection with a high accuracy and without fail. Further, the method uses electromagnetic waves, and therefore it is resistant to being affected by the surrounding environments.

DESCRIPTION OF THE EMBODIMENTS

Figure 1:
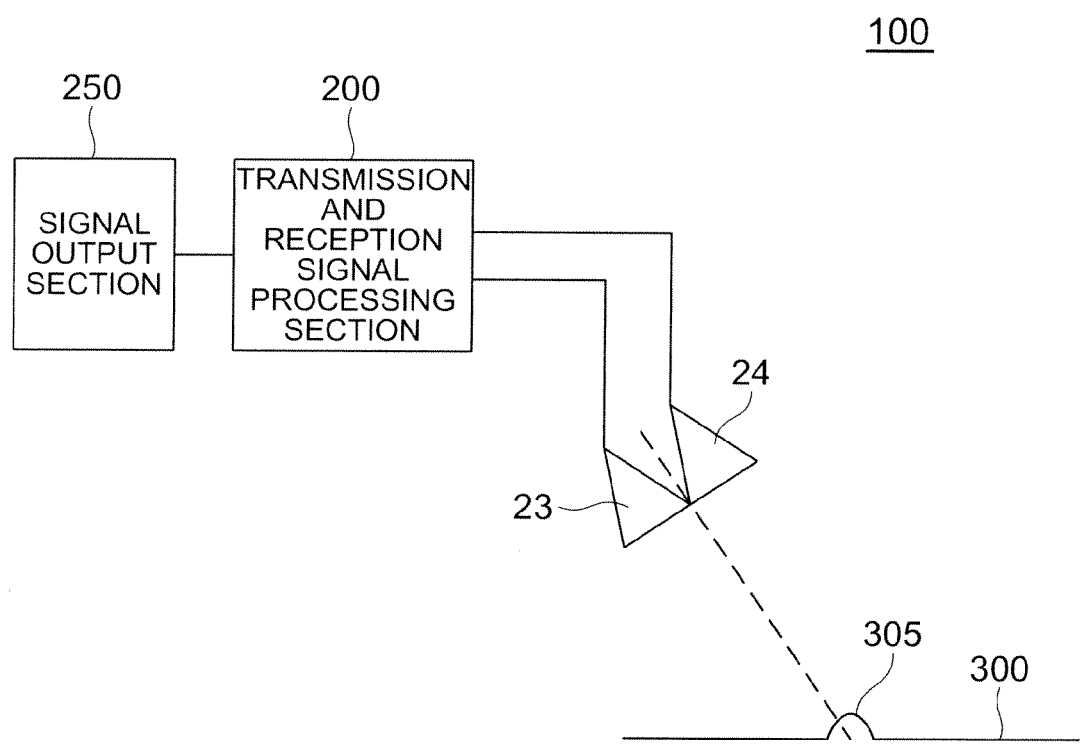
FIG. 1 shows a configuration of a projection detecting apparatus according to an embodiment of the present invention.

FIG. 1 shows a configuration of a projection detecting apparatus 100 according to an embodiment of the present invention. The projection detecting apparatus 100 includes a transmission antenna 23, a reception antenna 24, a transmission and reception signal processing section 200 and a signal output section 250. The transmission and reception signal processing section 200 generates a signal to be transmitted and sends it to the transmission antenna 23. The transmission antenna 23 radiates electromagnetic waves to an object to be detected. The object to be detected is a projection 305 on a metal surface. The reception antenna 24 receives electromagnetic waves reflected on the object to be detected. In the present embodiment, the transmission antenna 23 and the reception antenna 24 are arranged so as to be adjacent to each other. The transmission and reception signal processing section 200 generates a projection signal which includes information on a projection on a metal surface by processing the transmitted signal and the received signal. The signal output section 250 converts a format of the projection signal which includes information on a projection on a metal surface into a desired format and outputs it. The signal output section 250 may be a display which indicates a position and a size of a projection or a voice alarm which notifies generation of a projection, for example.

The transmission and reception signal processing section 200 will be described below. As the transmission and reception signal processing section 200, for example, a system disclosed in JP20009-98097A can be used. The principle and structure of the transmission and reception signal processing section 200 will be outlined below. A further detail is disclosed in JP20009-98097A.

First the principle of the transmission and reception signal processing section 200 will be described. The transmission and reception signal processing section 200 functions to obtain information on presence or absence, a shape, a position and the like of an object to be measured through a time difference between a transmitted signal and a signal which has been reflected by an object to be detected and then has been received.

The transmission and reception signal processing section 200 uses first and second pseudo random signals. The repetition frequency of the first pseudo random signal is $f_1$, the repetition frequency of the second pseudo random signal is $f_2$, and the patterns of the pseudo random signals are the same. Assume that $f_1 > f_2$.

Assuming that a period in which the reference signal obtained by correlating the first pseudo random signal to be transmitted and the second pseudo random signal reaches a maximum value is $T_B$, a difference between the wave number of the first pseudo random signal and that of the second pseudo random signal included in $T_B$ becomes equal to a wave number N in one period.

That is;

$$T_B \cdot f_1 = T_B \cdot f_2 + N$$

From the equation described above, $T_B$ is given by Equation (1) described below.

$$T_B = N/(f_1 - f_2) \quad (1)$$

As the difference between the two clock frequencies decreases, the period $T_B$ in which the reference signal reaches a maximum value increases.

The transmission and reception signal processing section 200 phase-modulates carrier waves by the first pseudo random signal and sends the modulated signal to the transmission antenna 23. Electromagnetic waves transmitted by the transmission antenna 23 are reflected on the object and received by the reception antenna 24. A propagation time from the transmission to the reception is represented as τ. A measured time difference between the time at which the pulse signal of the reference signal is generated and the time at which the pulse signal of object detection is generated by demodulating the received signal with the second pseudo random signal for coherent detection, is represented as $T_D$. Then, since the wave number of the second pseudo random signal generated in $T_D$ is smaller than the wave number of the first pseudo random signal generated in $T_D$ by the wave number of the first pseudo random signal generated in time τ, the following equation is established.

$$T_D \cdot f_2 = T_D \cdot f_1 - \tau \cdot f_1$$

From the equation described above, $T_D$ is given by Equation (2) described below.

$$T_D = \tau \cdot f_1/(f_1 - f_2) \quad (2)$$

That is, the propagation time τ is measured as $T_D$ which is enlarged in time or is reduced in speed by the factor of $f_1(f_1-f_2)$.

Assuming that the propagation speed is v and the distance to the target is x, the propagation time is given by τ=2x/v. Accordingly, Equation (3) described below is obtained from Equation (2).

$$x = (f_1 - f_2) \cdot v \cdot T_D/(2f_1) \quad (3)$$

According to Equation (3), time difference $T_D$ corresponds to distance x.

Figure 2:
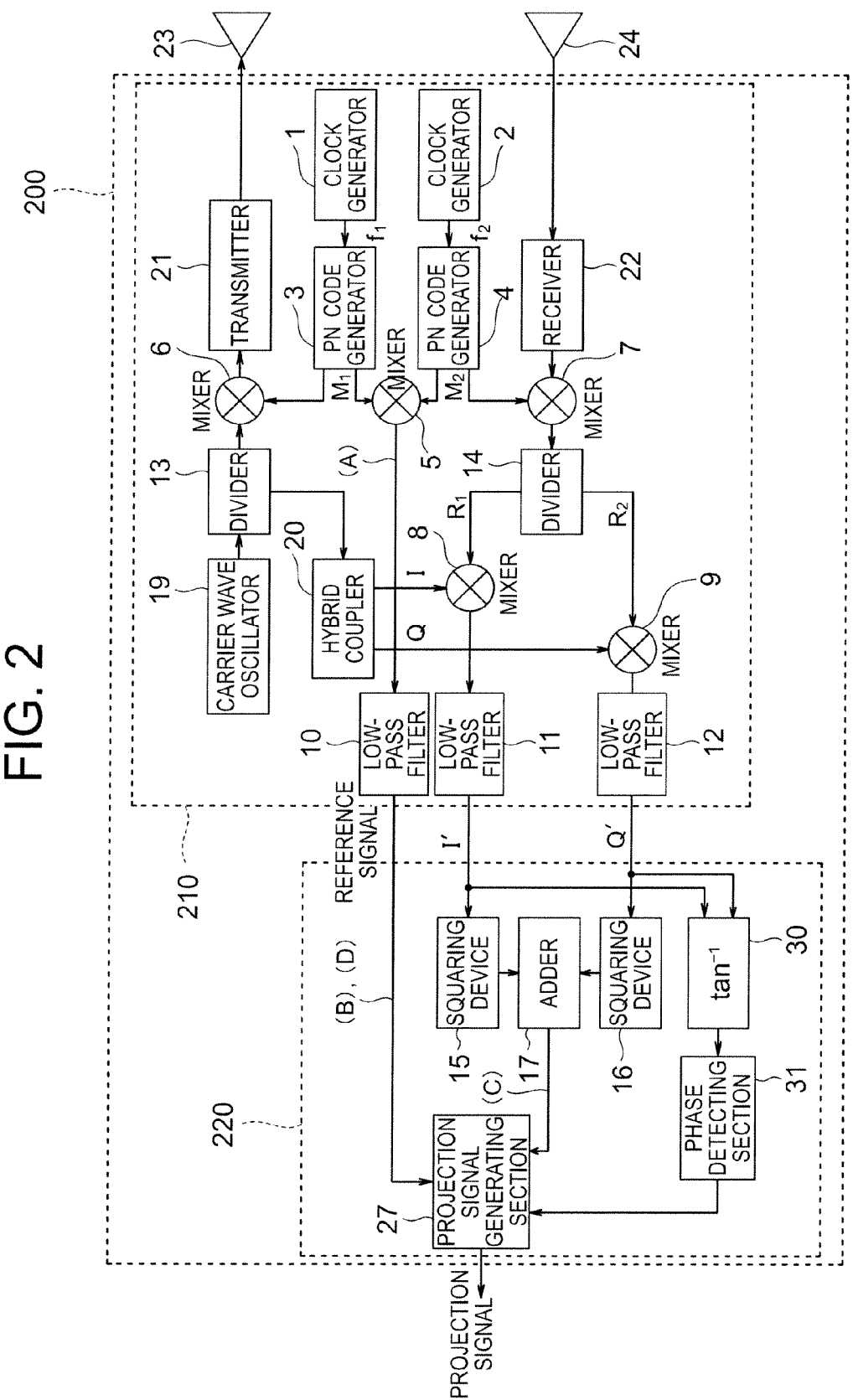
FIG. 2 is a schematic diagram showing the transmission and reception signal processing section.

FIG. 2 is a schematic diagram showing the transmission and reception signal processing section 200. The transmission and reception signal processing section 200 includes a microwave processing section 210 and a digital signal processing section 220. In FIG. 2, clock generators are indicated by reference numerals 1 and 2, pseudo random signal (PN code) generators are indicated by reference numerals 3 and 4, and multipliers (mixers), e.g., double balanced mixers are indicated by reference numerals 5 to 9. Here, the multiplier 6 is used as phase modulation means of a carrier wave.

Low-pass filters are indicated by reference numerals 10 to 12. The first correlation computing means which obtains correlation between the first pseudo random signal and the second pseudo random signal, includes the multiplier 5 and the low-pass filter 10, and the second correlation computing means which obtains correlation between the second pseudo random signal and the received signal, includes the multiplier 7 and the low-pass filters 11 and 12. Dividers are indicated by reference numerals 13 and 14, squaring devices are indicated by reference numerals 15 and 16, and an adder is indicated by reference numeral 17. The orthogonal demodulation means includes the multipliers 8 and 9, the squaring devices 15 and 16, and the adder 17.

A projection signal generating section 27 generates a projection signal using the reference signal which is the output of the low-pass filter, the output of the adder 17 and the output of a phase detecting section 31. The output of the phase detecting section 31 is used to increase accuracy of measured distance toward the object.

Figure 3:
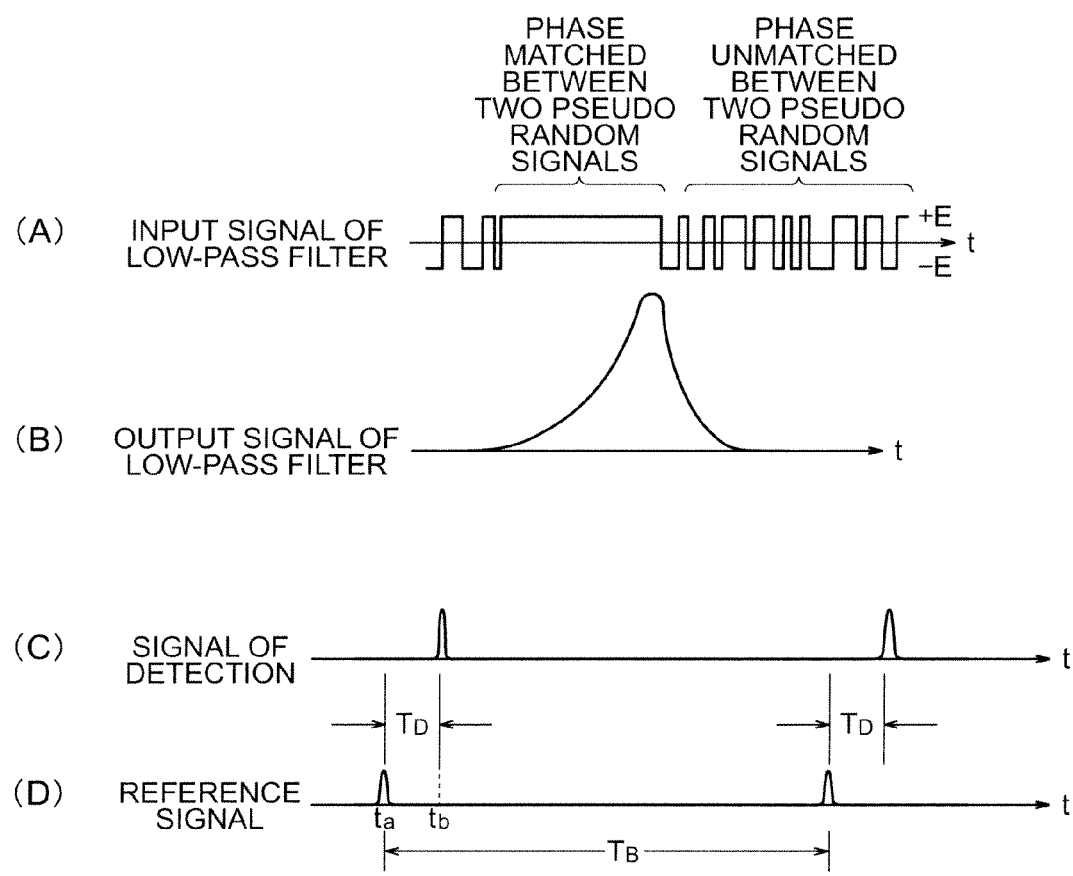
FIG. 3 shows the input signal of the low-pass filter 10 (A), the output signal of the low-pass filter 10 (B), a signal of detection which is the output of the adder 17 (C) and the reference signal (D.

FIG. 3 shows the input signal (A) of the low-pass filter 10, the output signal (B) of the low-pass filter 10, a signal of detection (C) which is the output of the adder 17 and the reference signal (D). The reference signal is the output signal of the low-pass filter 10. These signals are indicated by the above-mentioned reference characters in FIG. 2.

Information on presence or absence, a shape, a position and the like of an object to be measured can be obtained by the signal of detection obtained as described above.

In the embodiment described above, pseudo random signals are used to detect a projection. Alternatively, pulse-compression method and FM-CW method which are well known in the field of radar technology can also be used.

In a projection detecting apparatus according to the present embodiment, unidirectional antennas are used. Unidirectional antennas are those which radiate electromagnetic waves in one predetermined direction. More specifically, unidirectional antennas include parabolic antennas and horn antennas. By the use of unidirectional antennas, projections existing in an area in the direction can be detected efficiently.

Figure 4A:
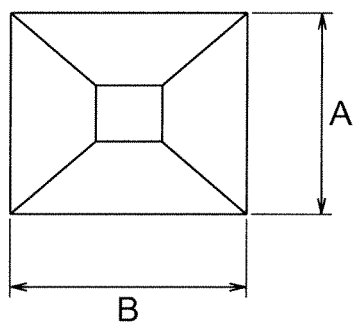
FIGS. 4A and 4B show an example of an arrangement of the transmission antenna and the reception antenna.
Figure 4B:
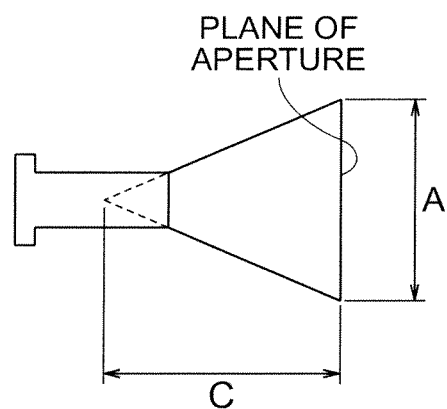

FIGS. 4A and 4B show an example of an arrangement of the transmission antenna 23 and the reception antenna 24. In the present embodiment, the antennas are pyramidal horn antennas. The directional gain is an important parameter which represents performance of the antenna. The directional antenna indicates intensity of energy at the radiation angle at which radiation is maximized as gain with respect to a virtual isotropic antenna which radiates electromagnetic waves in all directions. The unit is dBi. As the directional gain increases, the antenna has a more strong directionality. When A, B and C shown in FIGS. 4A and 4B are increased, for example, the directional gain is increased. Further, the directional gain is affected by frequency, that is, wavelength, of electromagnetic wave. Electromagnetic waves are transmitted or received through the plane of the aperture shown in FIG. 4B.

Figure 14:
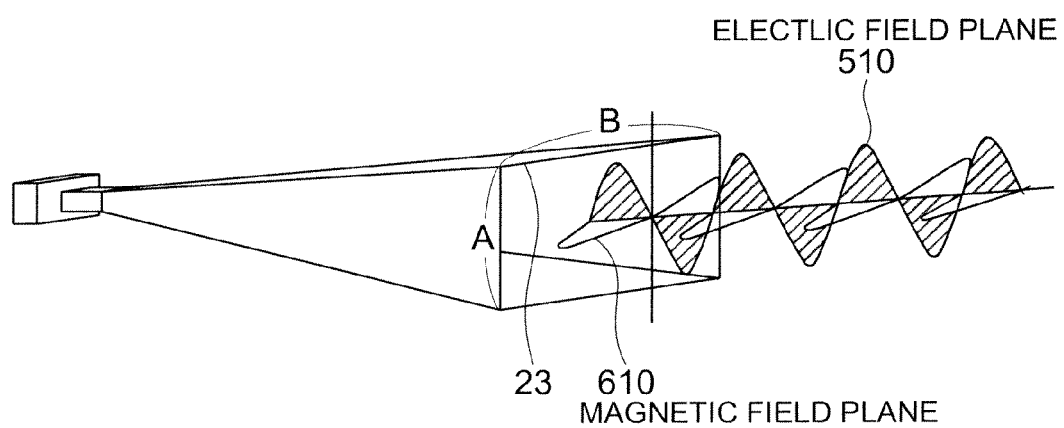
FIG. 14 is a conceptual diagram showing electric field plane and magnetic field plane of electromagnetic wave radiated by the transmission antenna.

FIG. 14 is a conceptual diagram showing electric field plane 510 and magnetic field plane 610 of electromagnetic wave radiated by the transmission antenna 23. The electric field plane 510 is formed in such a way that it is orthogonal to the plane of the aperture and parallel to the shorter side of the aperture, whose length is A. The magnetic field plane 610 is formed in such a way that it is orthogonal to the plane of the aperture and parallel to the longer side of the aperture, whose length is B. That is, the electric field plane 510 and the magnetic field plane 610 are orthogonal to each other.

Figure 15:
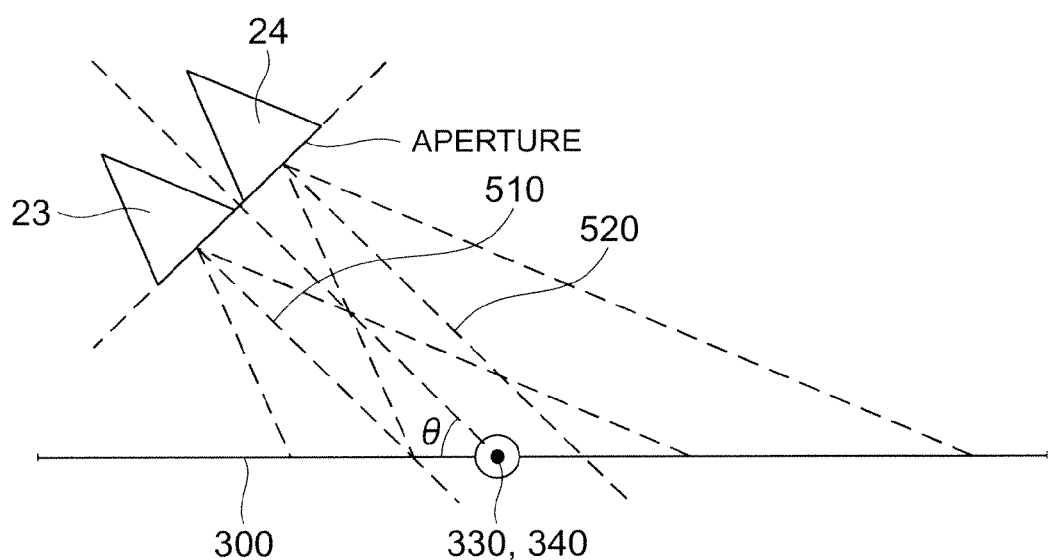
FIG. 15 shows a relationship between the plane of the aperture of the antennas and the running direction of the strip.

FIG. 15 shows a relationship between the plane of the aperture of the antennas and the running direction 330 of the strip 300. FIG. 15 is a view of a cross section which is orthogonal to the surface of the strip. In FIG. 15, the strip 300 runs in the direction orthogonal to the sheet surface. In FIG. 15, the symbol at the center of the strip means that the strip is running towards the top side of the sheet. The transmission antenna 23 and reception antenna 24 are arranged in such a way that the electric field plane 510 of electromagnetic wave transmitted by the transmission antenna 23 and the electric field plane 520 of electromagnetic wave received by the reception antenna 24 are parallel to the running direction of the strip 300. In FIG. 15, since the running direction 330 of the strip is orthogonal to the sheet surface, the electric field plane 510 of electromagnetic wave transmitted by the transmission antenna 23 and the electric field plane 520 of electromagnetic wave received by the reception antenna 24 are parallel to the running direction 330 of the strip when the transmission antenna 23 and the reception antenna 24 are arranged in such a way that the shorter side of the aperture, whose length is A is orthogonal to the sheet surface. Projections (strip width reduction) are generated along the direction of the strip 300, and therefore the projections are detected more effectively by electromagnetic waves which have electric field planes parallel to the running direction of the strip 300. The electromagnetic waves travel in the direction orthogonal to the plane of the apertures of the antennas. An angle between the travelling direction of the electromagnetic waves and the surface of the strip is represented by θ. θ will be described later.

Figure 16:
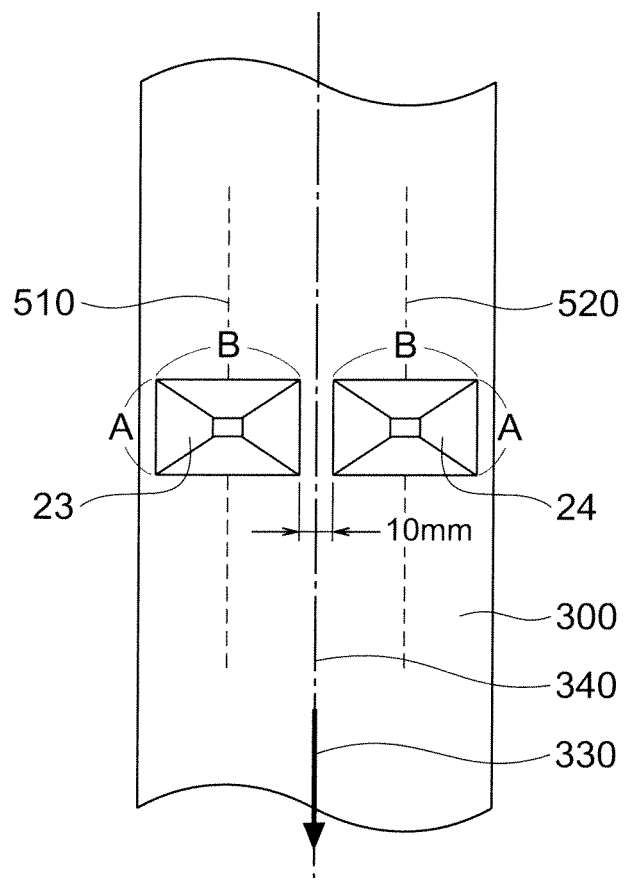
FIG. 16 shows a relationship between the antennas and the running direction 330 of the strip.

FIG. 16 shows a relationship between the antennas and the running direction 330 of the strip. In FIG. 16, the surface of the strip 300 and that of the apertures of the antennas are parallel to the sheet surface. That is, FIG. 16 shows the case in which θ in FIG. 15 is 90 degrees. Actually, θ should preferably be in a range from 40 degrees to 60 degrees as described later. When the antennas are set in such a way that θ is set to a value in a range from 40 degrees to 60 degrees and the shorter side of the aperture, whose length is A is parallel to the central axis 340 of the strip (that is, the running direction 330 of the strip), the electric field plane 510 of electromagnetic waves transmitted by the transmission antenna 23 and the electric field plane 520 of electromagnetic waves received by the reception antenna 24 are parallel to the running direction 330 of the strip become parallel to the running direction 330 of the strip.

The frequency range of electromagnetic waves used for the projection detecting apparatus according to the present embodiment is 3 to 30 GHz (centimeter band) and 30 to 300 GHz (millimeter band). When the frequency is increased, the resolution is improved and therefore accuracy of detection is improved. However, as the frequency is increased when an area of the aperture remains unchanged, directionality becomes stronger and therefore it becomes more difficult to grasp targets in a wide range. Accordingly, the frequency range described above has been selected. More specifically, electromagnetic waves of 10 GHz and 24 GHz are used.

Figure 5A:
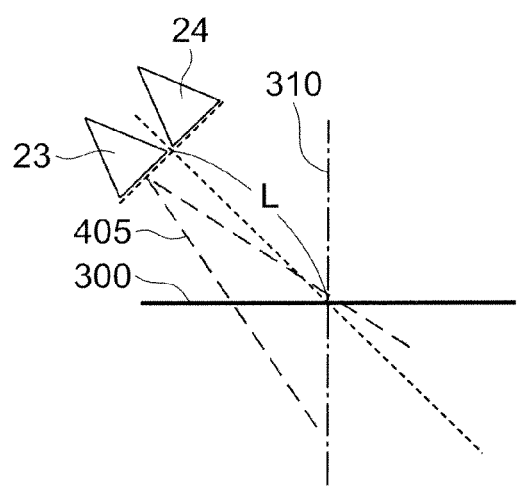
FIGS. 5A and 5B show relationships between directionality and detecting ability of the antennas.
Figure 5B:
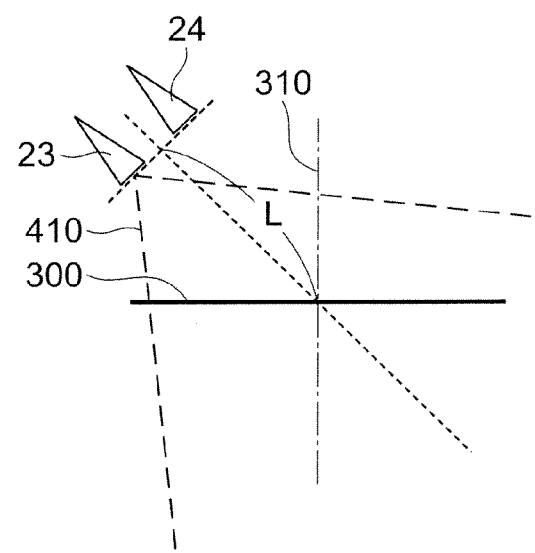

FIGS. 5A and 5B show a relationship between directionality and detecting ability of the antennas. FIG. 5A shows the case of high directional gain while FIG. 5B shows the case of low directional gain. In FIG. 5A, electromagnetic waves are radiated by the transmission antenna 23 toward the metal strip 300 in a range indicated with 405. The position of the center in width direction of the metal strip is indicated with 310. The range indicated with 405 is restricted because of high directionality. Accordingly, the detecting range becomes narrow. On the other hand, resolution of detection becomes high. In FIG. 5B, electromagnetic waves are radiated by the transmission antenna 23 toward the metal strip 300 in a range indicated with 410. The range indicated with 410 is wide because of low directionality. Accordingly, the detecting range becomes wide. On the other hand, resolution of detection becomes low.

In the present embodiment, the transmission antenna 23 and the reception antenna 24 are arranged at a position which is away from the center 310 of the metal strip in width direction toward one of the edges in such a way that they are adjacent to each other. As described above, the plane of the apertures of the transmission antenna 23 and the reception antenna 24 is parallel to the running direction of the strip, that is, the direction orthogonal to the sheet surface of FIGS. 5A and 5B. Further, the position of the transmission antenna 23 and that of the reception antenna 24 can be replaced with each other.

In the present embodiment, assuming that a distance L shown in FIGS. 5A and 5B is from 500 to 1200 mm and a projection corresponding to a metal bar on the metal strip whose diameter is 3 mm is to be detected, the directional gain is set to a value in the range from 15 dBi to 25 dBi. When the directional gain is smaller than the lower limit, a resolution for detecting a projection having the above-described size can hardly be obtained. When the directional gain is larger than the upper limit, a detection range sufficient for the width cannot be obtained.

Figure 6:
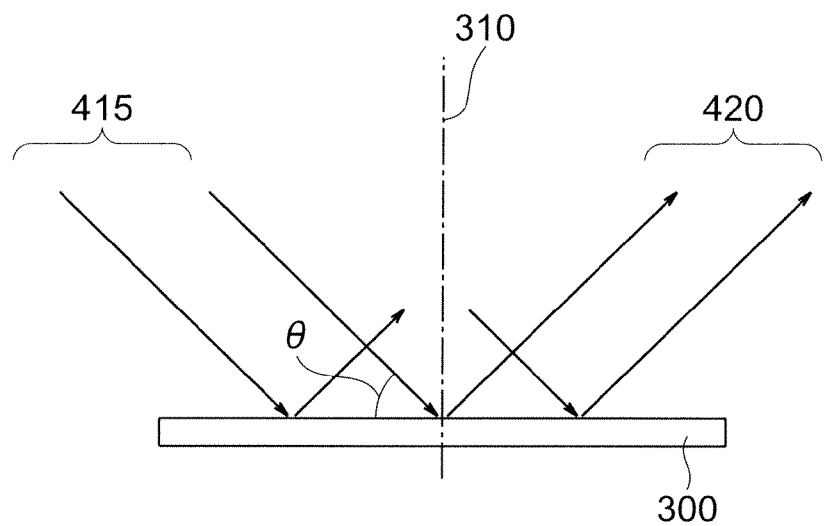
FIG. 6 shows the case in which a projection does not exist on the metal strip.
Figure 7:
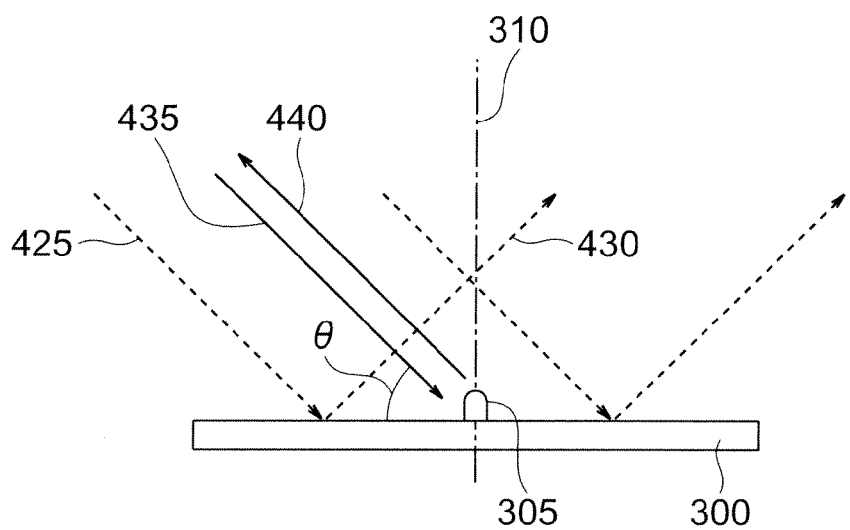
FIG. 7 shows the case in which a projection exists on the metal strip.

FIGS. 6 and 7 show relationships between an angle θ formed between the metal surface and electromagnetic waves radiated by the transmission antenna 23 and behavior of the electromagnetic waves. FIG. 6 shows the case in which a projection does not exist on the metal strip 300 while FIG. 7 shows the case in which a projection 305 exists on the metal strip 300. When the angle θ is in a predetermined range in the case shown in FIG. 6, electromagnetic waves 415 radiated by the antenna 23 are reflected on the surface of the metal strip 300 to form reflected waves 420, which are not received by the reception antenna 24. When the angle θ is in the predetermined range in the case shown in FIG. 7, some electromagnetic waves 425 radiated by the antenna 23 are reflected on the surface of the metal strip 300 to form reflected waves 430, which are not received by the reception antenna 24 like in the case shown in FIG. 6. However, other electromagnetic waves 435 radiated by the antenna 23 are reflected by a projection 305 to form reflected waves 440, which are received by the reception antenna 24. The inventors of the present application have found that when θ is in a range from 40 to 60 degrees, the reception antenna 24 does not detect reflected waves in the case shown in FIG. 6 and detects reflected waves from the projection 305 without fail in the case shown in FIG. 7. When θ is smaller than the lower limit, reflected waves from the projection 305 are so small that the reception antenna 24 cannot detect the reflected waves in some cases in the case of FIG. 7. When θ is greater than the upper limit, the reception antenna might detect waves reflected on the metal surface in the case of FIG. 6. A relationship between angle θ and projection detection ability will be described in detail below.

Figure 8A:
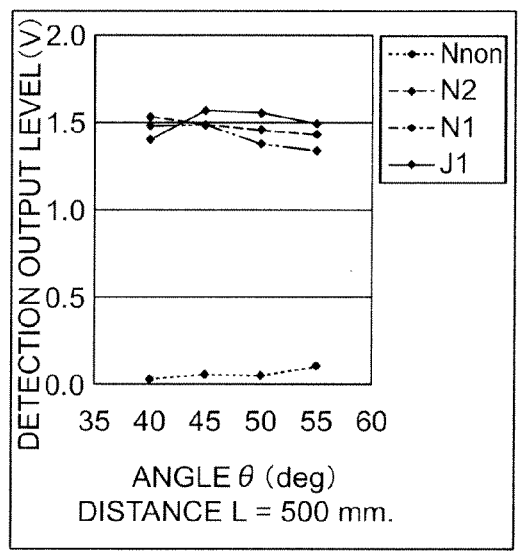
FIGS. 8A to 8D show relationships between angle θ and output of the projection detecting apparatus obtained by changing a distance between the antennas and the projection in the case shown in FIG. 7.
Figure 8B:
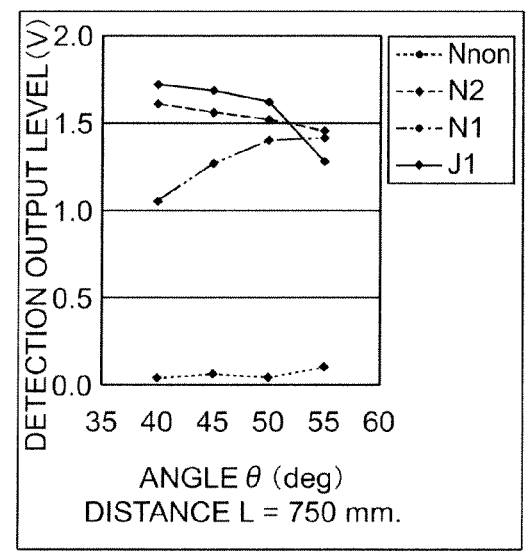
Figure 8C:
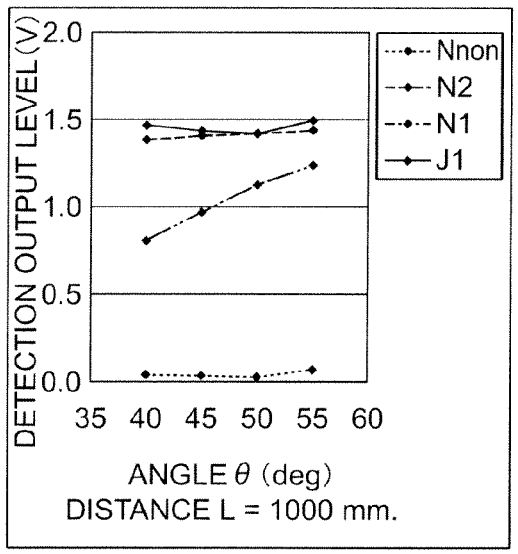
Figure 8D:
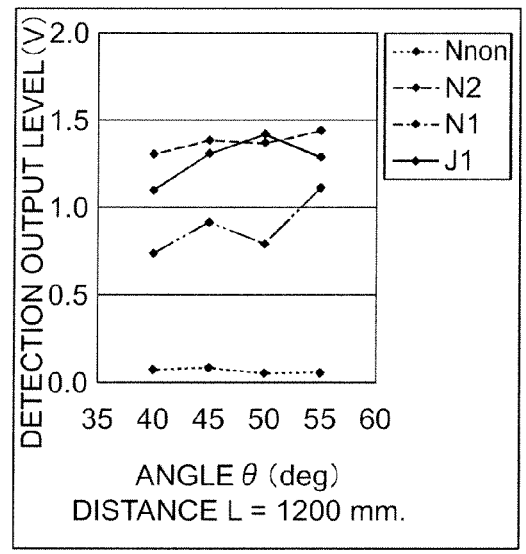

FIGS. 8A to 8B show relationships between angle θ and output of the projection detecting apparatus obtained by changing a distance between the antennas and the projection in the case shown in FIG. 7. In each of FIGS. 8A to 8B, the horizontal axis represents angle θ while the vertical axis represents output of the projection detecting apparatus (detection output level).

The frequency of electromagnetic waves is 24 GHz. The directional gain of the antennas is 20 dBi. Objects to be detected are shown below.

TABLE 1

| | |
|---|---|
| Nnon | Aluminum plate of 1600 mm × 1070 mm × 3 mm |
| N1 | Sample of aluminum plate on which metal bar of diameter of 3.0 mm is attached using aluminum tape |
| N2 | Sample of aluminum plate on which metal bar of diameter of 6.0 mm is attached using aluminum tape |
| J1 | Sample of actual strip with width reduction |

FIGS. 8A to 8B show cases in which distance L is 500 mm, 700 mm, 1000 mm and 1200 mm, respectively. According to FIGS. 8A to 8B, it is sufficiently possible to detect N1, N2 and J1 when a threshold of the detection output level is set to any value in a range from 0.2 V to 0.5V, for example. As to N1, the output becomes smaller as angle θ decreases and therefore angle θ should preferably be set to a value of 40 degrees or more. Based on data of 40 to 55 degrees, it can be estimated that detection in the case of 60 degrees will be sufficiently possible.

Figure 9:
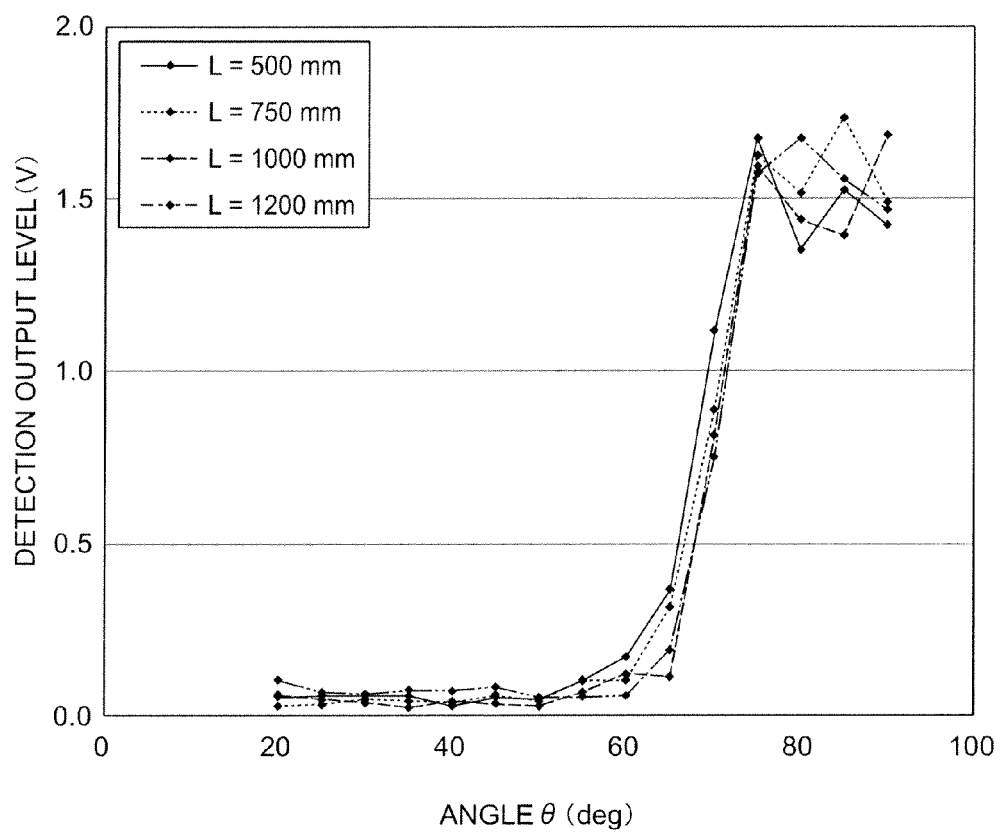
FIG. 9 shows a relationship between angle θ and output of the projection detecting apparatus (detection output level) in the case of FIG. 6.

FIG. 9 shows a relationship between angle θ and output of the projection detecting apparatus (detection output level) in the case of FIG. 6. In FIG. 9, the horizontal axis represents angle θ while the vertical axis represents output of the projection detecting apparatus. The frequency of electromagnetic waves is 24 GHz. As described above, a threshold of the detection output level is any value in a range from 0.2 V to 0.5V, for example. FIG. 9 shows data of the cases in which distance L is 500 mm, 700 mm, 1000 mm and 1200 mm. In any of the cases, the output increases when angle θ exceeds 60 degrees. The reason is that waves reflected by the metal strip 300 are detected by the reception antenna 24 as described above. Accordingly, angle θ should preferably be 60 degrees or less as described above.

According to data shown in FIGS. 8A to 8B and FIG. 9, angle θ should preferably be 40 degrees or more and 90 degrees or less as described above.

An example of specification of the projection detecting apparatus prepared based on the results described above is shown in Table 2.

TABLE 2

| Item | |
|---|---|
| Used frequency | 24 GHz |
| Type of antenna | Pyramidal horn antenna |
| Directional gain of antenna | 20 dBi |
| Orientation of antenna | Transmission and reception antennas are installed such that electrical field plane of electromagnetic waves is parallel to running direction of metal strip |
| Angle θ | 45 degrees |
| Distance L | 700 mm |

Orientation of the transmission antenna 23 and that of the reception antenna will be described. Strip width reduction is generated in the running direction of the strip around the center of the strip in width direction in many cases. When the transmission antenna 23 and the reception antenna 24 are installed in such a way that the plane of the apertures of the transmission antenna 23 and the reception antenna 24 is parallel to the running direction of the metal strip, electromagnetic waves from the transmission antenna 23 travel in the direction vertical to the plane of the aperture, are incident onto the metal strip in the direction vertical to the direction of strip width reduction, that is, the running direction of the strip, are reflected by the strip and reach the plane of the aperture of the reception antenna. In the above, "vertical" means not only to be vertical in a strict sense but also an angle range including 90 degrees with which reflected waves at sufficiently great level can be obtained from the projection (strip width reduction). When the transmission antenna 23 and the reception antenna 24 are installed in a way described above, reflected waves from strip width reduction generated around the center of the metal strip in width direction can be grasped without fail.

Figure 10:
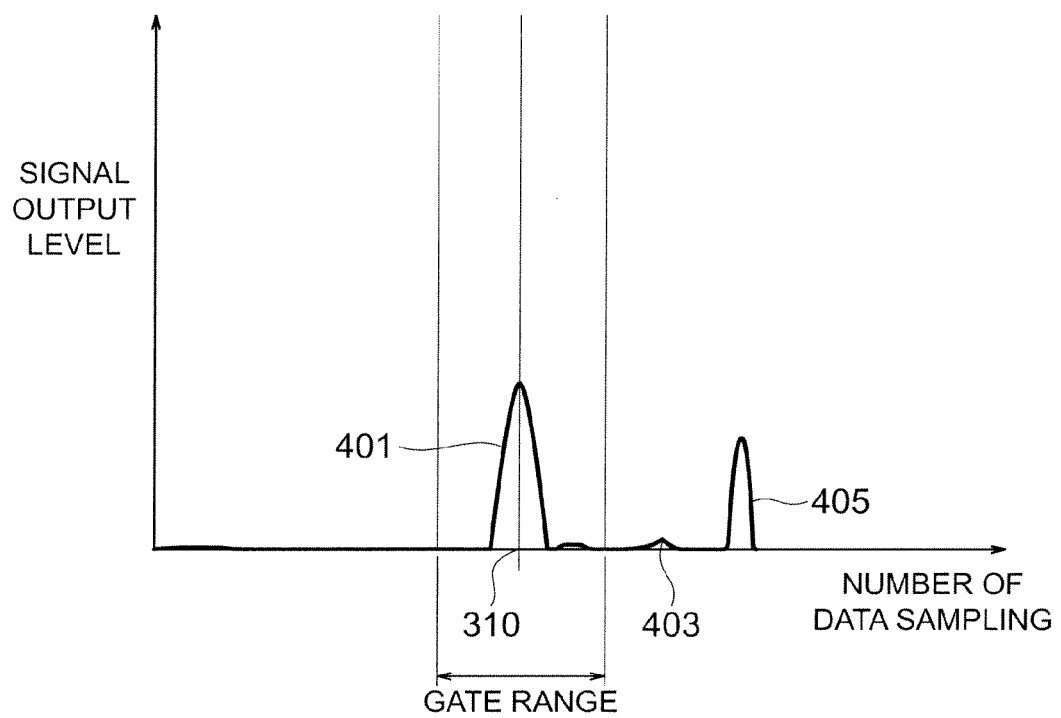
FIG. 10 shows a projection signal which is obtained by processing, by the transmission and reception signal processing section, signal of reflected waves obtained by the transmission antenna and the reception antenna, the transmission antenna and the reception antenna being installed as described above.

FIG. 10 shows a projection signal which is obtained by processing, by the transmission and reception signal processing section 200, signal of reflected waves obtained by the transmission antenna 23 and the reception antenna 24, the transmission antenna 23 and the reception antenna 24 being installed as described above. The horizontal axis of FIG. 10 represents the number of data sampling. The number of data sampling corresponds to time. The vertical axis of FIG. 10 represents magnitude of signal. A projection signal is indicated with 401. In FIG. 10, reflection signals 403 and 404 from objects besides the projection 305 appear. These signals are those of electromagnetic waves reflected by devices installed around the metal strip 300, for example. Strip width reduction 305 which is a projection is generated around the center of the metal strip 300 in width direction in many cases. In FIG. 10, the center of the metal strip 300 in width direction is indicated with 310. Accordingly, a gate may be set in a predetermined range including a point corresponding to the center of the metal strip 300 in width direction in time-axis, and a projection signal may be selected from signals within the gate. A gate range may be 30 to 70% of a width of the metal strip 300. When the gate range is determined as shown in FIG. 10, the signals 403 and 405 can be removed.

Figure 11:
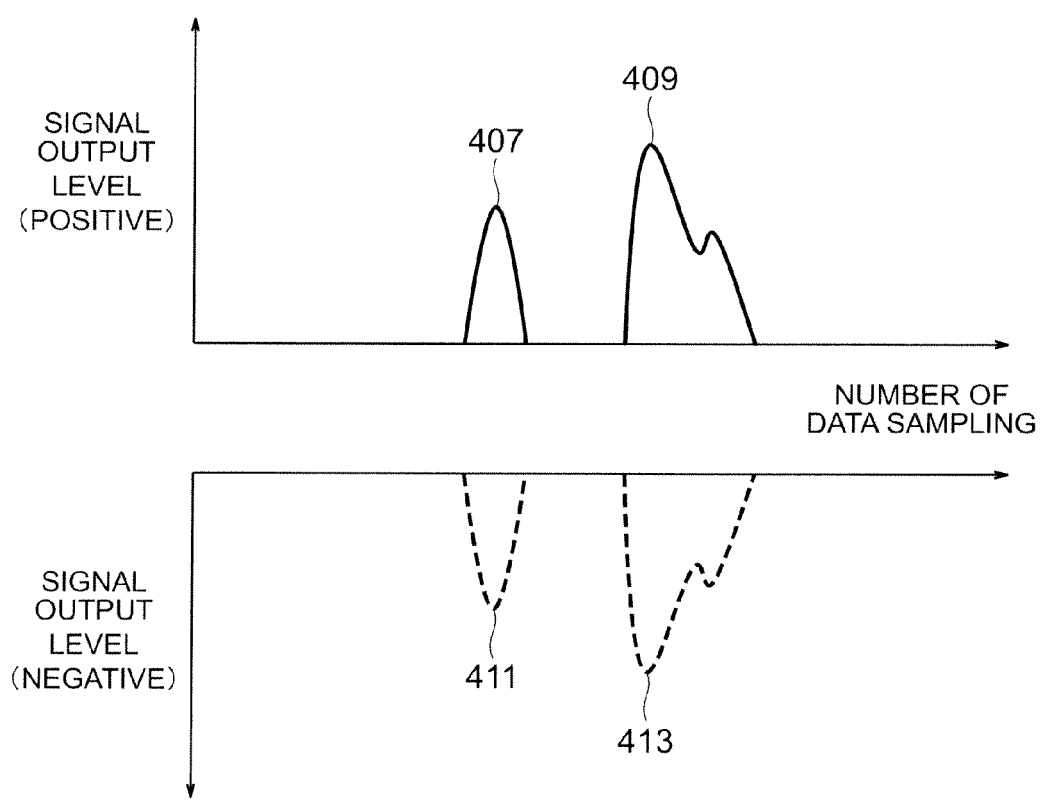
FIG. 11 shows a method for removing unnecessary signals.

FIG. 11 shows a method for removing unnecessary signals. The upper drawing in FIG. 11 shows signals of reflected waves in the absence of a projection, that is, in the case shown in FIG. 6. The signals are obtained by processing the reflected waves obtained by the transmission antenna 23 and the reception antenna 24 with the transmission and reception signal processing section 200. The horizontal axis of FIG. 11 indicates the number of data sampling. The number of data sampling corresponds to time. The vertical axis of FIG. 11 indicates magnitude of signal. In the upper drawing in FIG. 11, signals 407 and 409 of reflected waves from objects besides the projection 305 appear. These signals are called unnecessary signals. In FIG. 11, unnecessary signals have been magnified for better understanding. The lower drawing in FIG. 11 shows the unnecessary signals reversed in sign. These signals are called negative unnecessary signals. That is, a sum of the unnecessary signal 407 and the negative unnecessary signal 411 is zero and a sum of the unnecessary signal 409 and the negative unnecessary signal 413 is zero.

The projection signal generating section 27 of the transmission and reception signal processing section 200 previously stores the negative unnecessary signals 411 and 413 obtained in the absence of a projection and adds these negative unnecessary signals previously stored to a signal of detection (signal (C) in FIG. 3) to generate a projection signal. According to the method described above, unnecessary signals which cannot be removed by a gate because they are overlapped with the projection signal in time axis can be removed.

Figure 12:
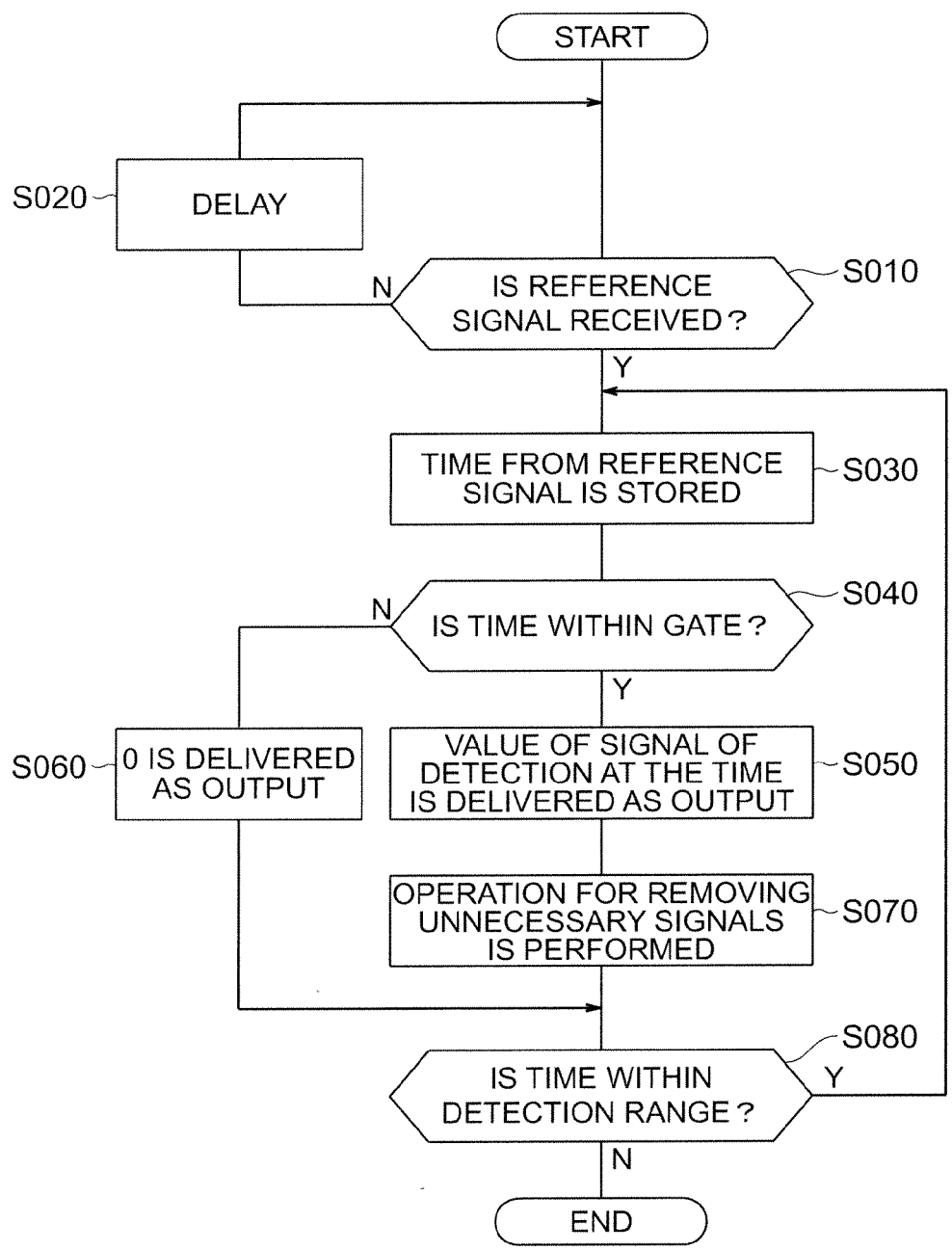
FIG. 12 shows operation of the projection signal generating section 27 of the transmission and reception signal processing section.

FIG. 12 shows operation of the projection signal generating section 27 of the transmission and reception signal processing section 200.

In step S010 of FIG. 12, it is determined whether or not the reference signal (signal (D) in FIG. 3D) has been received. When the reference signal has been received, the process goes to step S030. When the reference signal has not been received, the process goes to step S020.

In step S020 of FIG. 12, after a predetermined time has lapsed, the process goes to step S010.

In step S030 of FIG. 12, a time from the reference signal is stored.

In step S040 of FIG. 12, it is determined whether or not the time is within the gate. When the time is within the gate, the process goes to step S050. When the time is not within the gate, the process goes to step S060.

In step S050 of FIG. 12, a value of the signal of detection at the time (signal (C) in FIG. 3) is delivered as an output.

In step S060 of FIG. 12, 0 is delivered as an output and the process goes to step S080.

In step S070 of FIG. 12, operation for removing unnecessary signals is performed. More specifically, a sum of the output obtained in step S050 and negative unnecessary signals is delivered as an output.

In step S080 of FIG. 12, it is determined whether or not the time is within a detection range. When the time is within the detection range, the process goes to step S030. When the time is not within the detection range, the process is completed.

Figure 13:
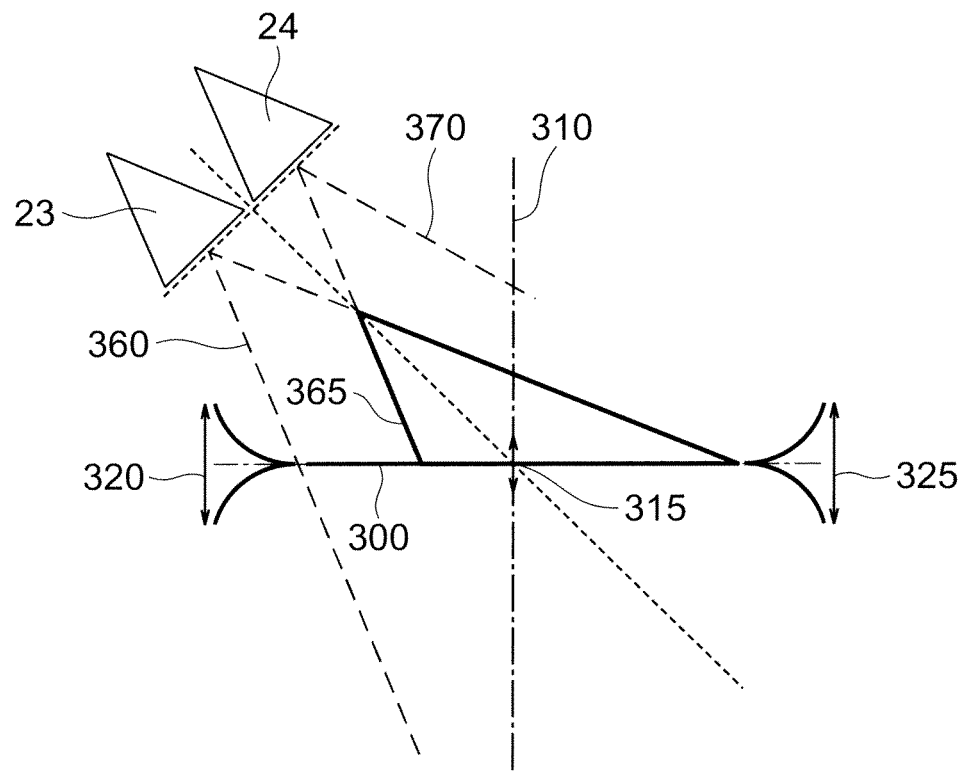
FIG. 13 illustrates a change in position (a flutter) of the running metal strip in the direction vertical to the surface.

FIG. 13 illustrates a change in position (a flutter) of the running metal strip in the direction vertical to the surface. Amplitude of flutter reaches approximately 20 mm at maximum at the ends in width direction of the metal strip 300 (320 and 325 in FIG. 13). The amplitude is approximately 10 mm at maximum around the center in width direction 310 of the metal strip (315 in FIG. 13). In FIG. 13, an electromagnetic wave radiation range of the transmission antenna 23 is indicated with 360 while an electromagnetic wave reception range of the reception antenna 24 is indicated with 370. A projection detection range is indicated with 365. It has been confirmed that the output of the projection detecting apparatus remains substantially unchanged with respect to the position in the absence of a flutter when a position of the surface of the strip 300 changes by 10 mm in the direction vertical to the surface. The reason is that an inclination of the surface of the metal strip 300 is kept substantially constant even in the case of a flutter, and therefore reflection on the surface and reflection on the projection remain unchanged. The projection detecting apparatus according to the present invention uses reflection in the detection range 365 of a certain size as described above, and therefore the apparatus is more robust against a flutter of the strip than the laser system using data at a predetermined point.

In the embodiment described above, a metal object on which a projection is generated is a running strip. In another embodiment, a metal object may be shaped in tube or in bar provided that the shape has a surface which reflects electromagnetic waves. Further, the present invention can also be applied to a stationary object to be detected although it can be particularly advantageously applied to an object to be detected which is running because the method is robust against a change in position of the object to be detected and surrounding environments.

| Explanation of reference numerals | |
|---|---|
| 23 | transmission antenna |
| 24 | reception antenna |
| 200 | transmission and reception signal processing section |
| 250 | signal output section |

We claim:

1. A projection detecting apparatus for detecting a projection on a surface of a running metal strip, comprising:
   a transmission antenna with a first aperture for radiating electromagnetic waves;
   a reception antenna with a second aperture for receiving reflected electromagnetic waves; and
   a transmission and reception signal processing section for processing a transmission signal and a reception signal,
   wherein the transmission antenna and the reception antenna are installed adjacent to each other at a position which is away from the center of the metal strip in a width direction toward an edge of edges of the metal strip in such a way that a plane of the first aperture of the transmission antenna and a plane of the second aperture of the reception antenna are parallel to a running direction of the metal strip and that electromagnetic waves transmitted by the transmission antenna and travelling perpendicular to the plane of the first aperture of the transmission antenna are incident on the surface of the metal strip at an angle, a value of the angle being from 40 to 60 degrees, and the transmission antenna and the reception antenna have unidirectionality and a detection range includes a space of a certain size around the direction of the unidirectionality.

2. A projection detecting apparatus according to claim 1, where the transmission and reception signal processing section detects a position of the projection using time between the radiation and the reception of electromagnetic waves.

3. A projection detecting apparatus according to claim 2, where the transmission and reception signal processing section sets a gate in time axis based on an area in which the projection can exist and detects a projection only within a range of the gate.

4. A projection detecting apparatus according to claim 1, where the transmission and reception signal processing section removes signals of reflected waves from objects besides the projection based on signals of reflected waves from the surface of the metal strip without a projection thereon.

5. A projection detecting apparatus according to claim 1, wherein the electromagnetic waves are within a frequency range from 3 GHz to 300 GHz.

6. A projection detecting apparatus according to claim 1, wherein a distance between the plane of the apertures and the center of the metal strip in the width direction is from 500 mm to 1200 mm, and a directional gain of the transmission antenna and a directional gain of the reception antenna range from 15 dBi to 25 dBi.

7. A projection detecting apparatus according to claim 1, wherein the transmission and reception signal processing section is configured to modulate electromagnetic waves to be transmitted by a first pseudo random signal of a repetition frequency of $f_1$ and to demodulate the received electromagnetic waves by a second pseudo random signal of a repetition frequency of $f_2$, a pattern of the second pseudo random signal is the same as a pattern of the first pseudo random signal, and $f_2$ being smaller than $f_1$.

8. A projection detecting method for detecting a projection on a surface of a running metal stripe, comprising the steps of:

generating, by a signal processing section, a transmission signal;

radiating, by a transmission antenna with a first aperture, electromagnetic waves as the transmission signal toward the surface of the metal strip in such a way that the electromagnetic waves travelling perpendicular to a plane of the first aperture of the transmission antenna is incident on the surface of the metal strip at an angle, a value of the angle being from 40 to 60 degrees, the transmission antenna having a directional gain, a value of the directional gain being from 15 dBi to 25 dBi, the transmission antenna being installed at a position away from the center of the metal strip in a width direction toward an edge of edges of the metal strip in such a way that the plane of the first aperture of the transmission antenna is parallel to the running direction of the metal strip, a distance between the position and the center of the metal strip being 500 mm to 1200 mm;

receiving, by a reception antenna with a second aperture, electromagnetic waves which have been reflected on the projection on the surface of the metal strip, the reception antenna having a directional gain, a value of the directional gain being from 15 dBi to 25 dBi, and the reception antenna being installed adjacent to the transmission antenna in such a way that a plane of the second aperture of the reception antenna is parallel to the running direction of the metal strip;

processing, by the signal processing section, received electromagnetic waves to generate a reception signal; and detecting the projection on the surface of the metal object strip by using the transmission signal and the reception signal.

\* \* \* \* \*